(12) United States Patent
Kubel et al.

(10) Patent No.: US 9,638,053 B2
(45) Date of Patent: May 2, 2017

(54) CONTROL SYSTEM FOR AN AXIAL FLOW TURBINE

(71) Applicant: ALSTOM Technology Ltd, Baden (CH)

(72) Inventors: Sigurd Kubel, Ehrendingen (CH); Wilhelm Reiter, Kussaberg (DE)

(73) Assignee: General Electric Technology GmbH, Baden (CH)

( * ) Notice: Subject to any disclaimer, the term of this patent is extended or adjusted under 35 U.S.C. 154(b) by 818 days.

(21) Appl. No.: 13/903,274

(22) Filed: May 28, 2013

(65) Prior Publication Data

US 2013/0323054 A1 Dec. 5, 2013

(30) Foreign Application Priority Data

May 31, 2012 (EP) .................................... 12170178

(51) Int. Cl.
*F01D 17/02* (2006.01)
*F01D 21/00* (2006.01)
*G01K 13/08* (2006.01)

(52) U.S. Cl.
CPC ............ *F01D 17/02* (2013.01); *F01D 21/003* (2013.01); *F05D 2260/80* (2013.01); *F05D 2260/97* (2013.01); *F05D 2270/808* (2013.01); *F05D 2300/603* (2013.01); *G01K 13/08* (2013.01)

(58) Field of Classification Search
CPC ............................... F01D 17/02; F01D 21/003
See application file for complete search history.

(56) References Cited

U.S. PATENT DOCUMENTS

| 3,885,822 | A | 5/1975 | Cohen et al. |
| 5,005,353 | A | 4/1991 | Acton et al. |
| 2005/0207880 | A1 | 9/2005 | Tarelin et al. |
| 2006/0188368 | A1* | 8/2006 | Jinnai ............... F01D 17/165 415/191 |
| 2007/0292265 | A1 | 12/2007 | Burdgick et al. |
| 2010/0226756 | A1 | 9/2010 | Mitchell et al. |
| 2011/0222582 | A1 | 9/2011 | Subramanian et al. |

FOREIGN PATENT DOCUMENTS

| CH | 547943 | | 8/1972 |
| CN | 102112854 | A | 6/2011 |
| DE | 102007027365 | A1 | 12/2007 |
| DE | 102009036624 | A1 | 2/2011 |
| EP | 1788197 | A1 | 5/2007 |

(Continued)

*Primary Examiner* — Woody Lee, Jr.
(74) *Attorney, Agent, or Firm* — GE Global Patent Operation; Cynthia W. Flanigan

(57) ABSTRACT

The invention relates to an axial flow turbine and method of operating thereof. The turbine comprises a last stage of rotating blades located towards a downstream end of the turbine having a distal region at an end of the airfoil of the blades. A monitoring control system has at least one sensor in the distal region of at least one last stage blade for measuring at least one physical property of the airfoil and a control element that is capable of influencing at least one physical property of the distal region. The control system further includes a controller that adjusts the control element based on at least measured physical property so by controlling the at least one physical property.

13 Claims, 2 Drawing Sheets

(56) References Cited

FOREIGN PATENT DOCUMENTS

| | | | | |
|---|---|---|---|---|
| EP | 2224379 | A1 | 9/2010 | |
| EP | 2388476 | A2 | 11/2011 | |
| JP | 62-261604 | | 11/1987 | |
| JP | 4-194302 | | 7/1992 | |
| JP | 2010112195 | A * | 5/2010 | ............ F01D 11/005 |
| JP | WO 2013042554 | A1 * | 3/2013 | ............ F01D 11/005 |
| JP | 2013-139767 | | 7/2013 | |
| WO | 2012003836 | A1 | 1/2012 | |

* cited by examiner

CONTROL SYSTEM FOR AN AXIAL FLOW TURBINE

CROSS-REFERENCE TO RELATED APPLICATIONS

This application claims priority to EP Application 12170178.3 filed May 31, 2012, the contents of which is hereby incorporated by reference in its entirety.

TECHNICAL FIELD

This invention relates generally to axial flow turbine control systems, including low-pressure steam turbines, and more specifically to control systems for last stage blades, in particular last stage hybrid composite blades.

BACKGROUND INFORMATION

The rotating blades of low-pressure steam turbines induce tremendous centrifugal forces into the rotor. This can be a limiting factor in designing the turbine for maximum efficiency. A solution is to use lower density blade materials as such blades exert less force into the rotor. This solution can, however, only be applied if the low-density material has adequate mechanical properties. While Titanium is one existing solution, in some circumstances it may be preferable to use alternatives with even better strength to weight ratios. Another alternative is composite materials, an example of which is disclosed in Swiss Patent Number CH547943.

A disadvantage of composite materials is that they typically have less temperature tolerance than metals. This can be a problem, in particular during low volume flow operation and full speed conditions when last stage blades are susceptible to windage heating of the blade tip area. Normal blade temperatures typically do not exceed 65° C. However, without corrective means, due to this condition, last stage blade tip temperatures can exceed 250° C. At such temperatures, the mechanical properties of composite material are significantly impacted and they may undergo permanent degradation including deformation and reduced strength.

A solution to windage heating is provided by Patent application No. US2007/292265 A1. The solution comprises injecting a cooling medium in the vicinity of the last stage tip region. The medium, which includes either steam or water, may be injected from the casing either fore or aft of the blade tip. As an alternative, or in addition, a small extraction groove for extracting flow through the outer sidewall may be provided near the blade tip just forward of the blade.

Typically these control measures are taken based on predictive assessment using means such as computational fluid dynamic calculation methods. As the optimum control measure typical varies between installations and further with operating conditions, simple universally applied threshold values are likely to lead to suboptimal control. In particular, the control action may inject more steam/water than is actually required. This may lead to excessive erosive attack, in particularly along the blades leading or trailing edges, dependent on how and where the injection occurs. In other case, the control action may not inject enough steam/water, resulting in inadequate cooling. In yet further cases, too much working fluid may be extracted via extraction grooves detrimentally affect steam turbine efficiency. It is therefore desirable to provide a control system that ensures acceptable blade life while maximising turbine efficiency and minimising the consumption of the cooling fluid.

SUMMARY

The disclosure is intended to provide a turbine that overcomes the problem of sub-optimal control of the detrimental effects of windage on the last stage blade distal region resulting in reduced blade life.

It attempts to address this problem by means of the subject matters of the independent claims. Advantageous embodiments are given in the dependent claims.

The disclosure is based on the general idea of providing a controller that uses direct measurement of a blade's physical property to initiate and modulate corrective action against blade overheating.

An aspect provides an axial flow turbine comprising a casing that defines a flow path for a working fluid therein. Within the casing, coaxial to the casing, is a rotor. A plurality of stages is mounted in the flow path. The stages each comprise a stationary row of vanes circumferentially mounted on the casing; and a rotating row of blades that are circumferentially mounted on the rotor wherein airfoils of the blades each extend into the flow path therein. Of the plurality of stages, the last stage blade row, which is defined as the blade flow located towards a downstream end of the turbine in the flow direction, includes a distal region at an end of the airfoil distal from the rotor. The turbine further comprises a monitoring control system having three main elements:

at least one sensor configured and arranged in the distal region of at least one last stage blade, for measuring at least one physical property of the airfoil in the distal region;

a control element, configured and arranged to influence at least one of the physical properties of the distal region of the last stage blades; and a controller, configured to adjust the control element based on at least one of the measured physical properties so by controlling at least one of the physical properties.

The feedback controller ensures that the control action can be optimised, ensuring that neither too much or too little control action is taken thus making it possible to optimise turbine efficiency in view of blade life.

In a further aspect, the sensor is embedded in the airfoil. Sensors located on the outer surface of the blades are typically operable only for a limited time, for example for the duration of a test run, before they are damaged and/or eroded. In additional located sensors on the outer surface of a blade can have a negative impact on a blades aerodynamic efficiency. This makes them unsuitable for commercial use. However, by embedding the sensor, these problems can be overcome.

In another aspect, the airfoil has a composite core body and further comprises a covering that covers at least a portion of the airfoil wherein the sensor is embedded between the composite core body and covering or alternatively between composite layers. In these locations, the sensor is located close to the outer surface of the airfoil so it makes it possible to estimate the extremes to which the airfoil is exposed to, without the disadvantages of having sensors located on the airfoil's surface as well as reducing the signal response time.

In a further aspect, the sensor is configured to measure one or more physical properties from a selection of strain, temperature and moisture content. While in particular temperature and the combined relationship of temperature and strain, has a universal influence on the longevity of most blade materials, moisture is of particular concern for blades made of composite materials that contain fibre material embedded in a polymer based matrix. Higher moisture content of the matrix material typically results in decreased e-moduli, strength and glass transition temperature. While a certain level of moisture absorption typically occurs at atmospheric condition, for example, during storage, wet conditions in the steam turbine may result in additional absorption, in particularly if excess wetness is created by the over injection of cooling water.

In an aspect the airfoil comprises a plurality of sensors distributed along the extensional length of the airfoil from the rotor wherein the controller is configured to adjust the control element based on the measurement profile of the plurality of sensors.

In an aspect, where the airfoil compromises conductive material, the conductive property is exploited by using the conductive material as a ground for the sensor. In this way, the sensor requires only one wire, which has the advantage that the wire can be laid so as to minimise strain, thus prolonging the life of the sensor.

In an alternative aspect, the sensor and the controller communicates, at least partially, by any know wireless means, thus simplifying sensor installation.

In an aspect, the control element is a means for adjusting at least one of a selection of water injection, steam injection, working fluid extraction and mass flow through the turbine.

A further aspect provides a method for controlling a physical property of a distal region of a last stage blade of an axial flow turbine. The method comprises the steps of:
 providing a control element configured and arranged to influence a physical property of the distal region;
 measuring a physical property of the distal region; and
 adjusting the control element in response to the measured physical property so by controlling the measured physical property.

The measured physical property of this aspect may be a selection of one or more of temperature, moisture, strain and moisture. Where the last stage blade is at least partially made of composite material, the step of measuring the physical property includes measuring the physical property at a point between the composite layers. The combination of temperature and strain sensors has the additional benefit that these temperature sensors can also be used for temperature compensation for the strain measurements.

In a further aspect, each of the aspects is incorporated into a low-pressure steam turbine.

It is a further object of the invention to overcome or at least ameliorate the disadvantages and shortcomings of the prior art or provide a useful alternative.

Other aspects and advantages of the present disclosure will become apparent from the following description, taken in connection with the accompanying drawings, which by way of example illustrate exemplary embodiments of the present invention.

BRIEF DESCRIPTION OF THE DRAWINGS

By way of example, an embodiment of the present disclosure is described more fully hereinafter with reference to the accompanying drawings, in which.

DETAILED DESCRIPTION

Figure 1:
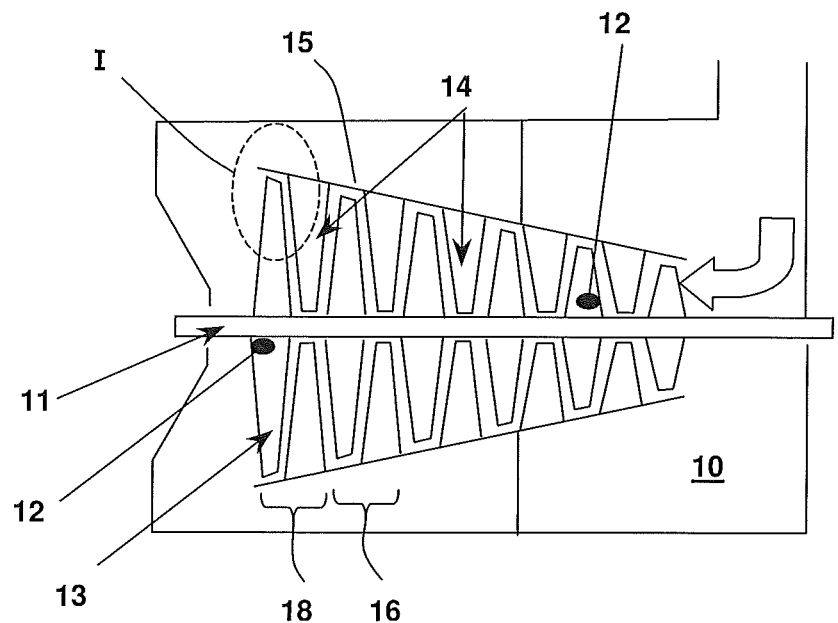
FIG. 1 is a schematic of an exemplary axial flow turbine.

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiments disclosed herein.

Throughout this specification reference to a controller is taken to mean a system for receiving an input, comparing the input with a set value, using an algorithm to calculate manipulate value and finally applying the manipulate value to a control element in order to achieve a control objective.

FIG. 1 shows an exemplary multiple stage 16 axial flow turbine 10. The turbine 10 comprises a casing 15 enclosing stationary vanes 14 that are circumferentially mounted thereon and rotating blades 12 that are circumferentially mounted on a rotor 11 wherein the rotor is located coaxially to the casing 15. The casing 15 itself defines a flow path for a working fluid therein. Each blade 12 has an airfoil 13 extending into the flow path from the rotor 11 to a distal region 19 wherein the distal region 19 is defined as the top one third of the airfoil 13. The airfoil 13 may be made of metal, including metal alloys, composites including layered composites that comprise layered carbon fibre reinforced polymers or metal matrix composites. The multiple stages 16 of the turbine 10 are defined as a pair of stationary vane 14 and a moving blade 12 rows wherein the last stage 18 of the turbine 10 is located towards the downstream end of the turbine 10 as defined by the normal flow direction through the turbine 10. The exemplary turbines 10 of this type includes steam turbines 10 and in particularly low pressure steam turbines 10.

Figure 2:
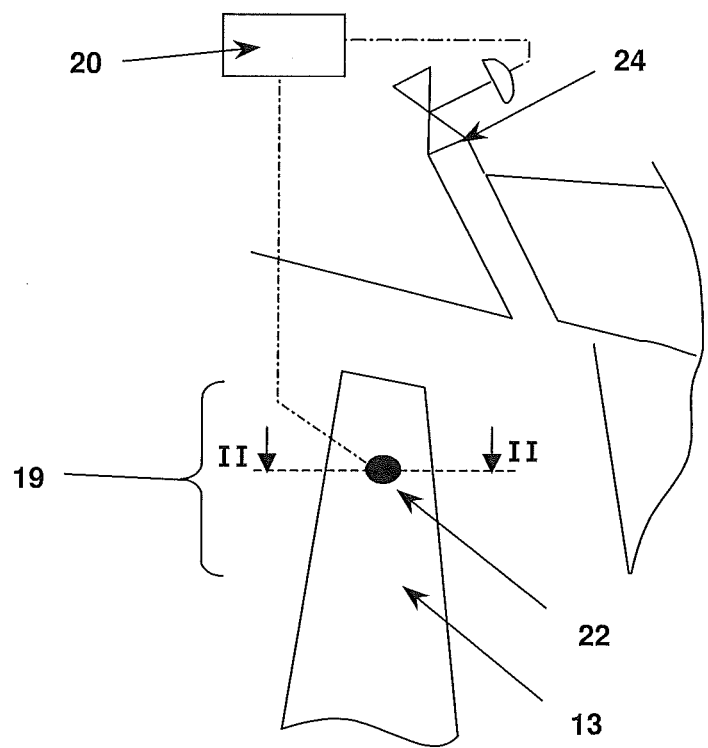
FIG. 2 is an expanded view of section I of a last stage blade of the turbine of FIG. 1, additionally showing an exemplary control system.
Figure 3:
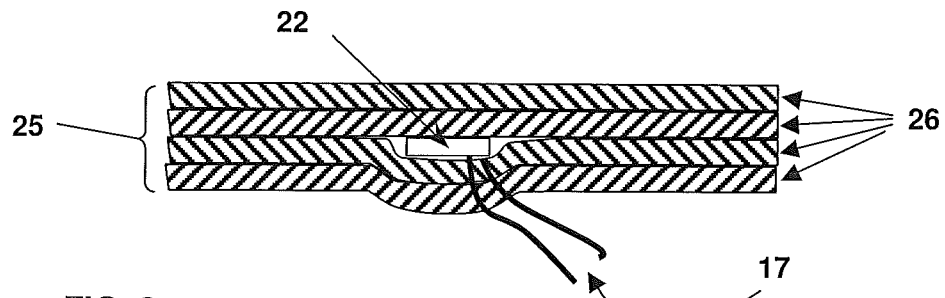
FIG. 3 is a cross sectional view through II-II of the blade tip of FIG. 2 showing an embedded sensor.
Figure 4:
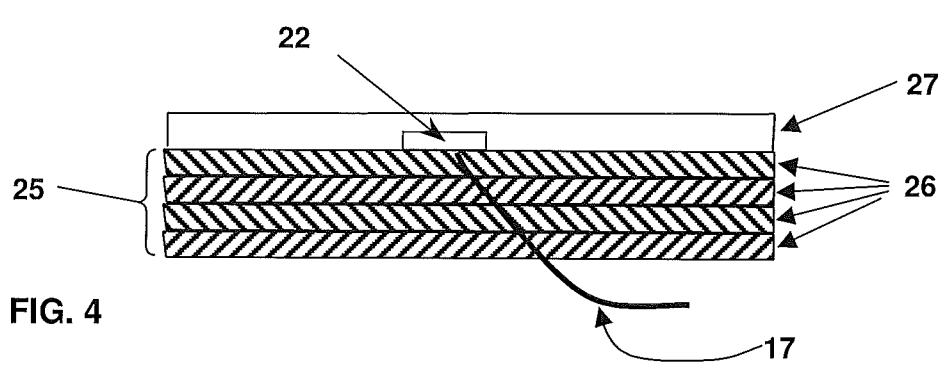
FIG. 4 is a cross sectional view through II-II of the blade tip of FIG. 2 showing a sensor embedded in the covering of an airfoil.

FIG. 2 shows an exemplary monitoring control system that may be applied to the turbine 10 shown in FIG. 1. The control system comprises at least one sensor 22 located in the distal region 19 of the airfoil 13 of at least one last stage 18 blade 12. The sensor 22 is preferably located so that is does not interfere with the aerodynamics of the blade 12, for example between the covering 27 and composite material as shown in FIG. 4 or else embedded in the composite material as shown in FIG. 3. In an exemplary embodiment, the covering 27 is a coating. In another exemplary embodiment, the covering 27 is a metal sheet. In an exemplary embodiment the blade 12 is made of metal and the sensor 22 is located in a cavity within the airfoil 13. In an exemplary embodiment the blade 12 is at least partially made of composite material and the sensor 22 is embedded between composite layers 26 of the composite, as shown in FIG. 3. In an exemplary embodiment, this is achieved by the sensor 22 being laid-in before the curing or resin infiltration process starts. The sensor 22 may alternatively be embedded before curing, in particularly when using pre-impregnation or resin infiltration (e.g. Resin Transfer Moulding) methods so that the sensor 22 forms an integrally part of the composite structure. In an exemplary embodiment, only after curing is a covering 27 applied.

As shown in FIG. 4, in an exemplary embodiment, the airfoil 13 has a covering 27 and the sensor 22 is embedded between the composite core body 25 of the airfoil 13 and the covering 27. In this exemplary embodiment, the airfoil 13 may be made of layered composite material, as shown in FIG. 4 or of unlayered material (not shown). This embodiment enables particularly effective measurement of the boundary conditions of the airfoil 13 and thus is particularly effective when the sensor 22 is a temperature sensor 22.

Figure 5:
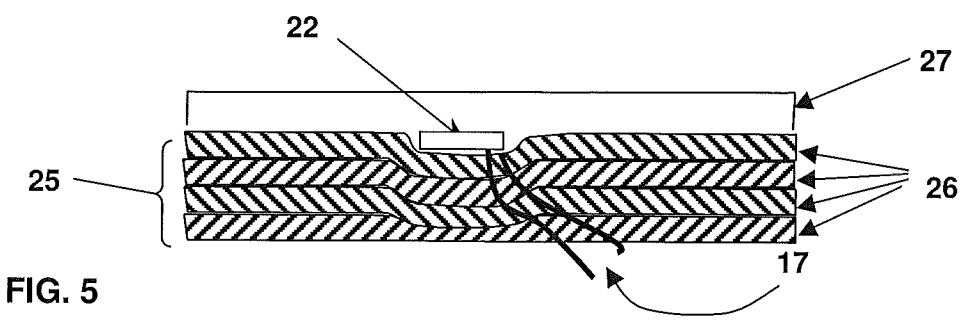
FIG. 5 is a cross sectional view through II-II of the blade tip of FIG. 2 showing a sensor embedded in recess and covered by a covering.

In another exemplary embodiment shown in FIG. 5, the composite core body 25 is cured with a recess. The sensor 22 is then fitted in the recess and then the covering 27 is then applied over the sensor 22.

The means of embedding a sensor 22 in an airfoil 13 is not limited to the provided exemplary embodiments but also include known methods that neither interfere with the aerodynamics of the airfoil 13 nor compromise its mechanical integrity to an extent that significantly impacts the service life of the blade.

In separate exemplary embodiments, the sensor 22 is a temperature sensor 22, a strain sensor 22, a temperature and strain sensor 22 or a moisture sensor 22. In an exemplary embodiment, a plurality of either the same or different sensors 22, i.e. temperature, strain or moisture, is embedded in the distal region 19 of the airfoil 13 of at least one last stage 18 blade 12.

As shown in FIG. 2, an exemplary embodiment further includes a control element 24 that is configured and arranged to influence localised temperature, strain, moisture or any combination of localised temperature, strain or moisture of the last stage 18 blades 12 as measured by the sensor 22. This can be achieved by several means, each of which may be equally effective.

In an exemplary embodiment, this is achieved by the control element 24 being configured to inject water or steam from a cavity into the casing 15, upstream of the distal region 19 of the last stage 18 blades 12 in a region prone to windage. The injected water or steam provides a cooling means to overcome localised heating of blades 12.

In another exemplary embodiment, this is achieved by the control element 24 being configured to inject water or steam from a cavity in the casing 15 from the casing 15 at a point downstream of the last stage 18 blades 12, for example in a diffusor of the turbine. The injected water or steam provides a cooling means to overcome localised heating of blades 12 while reducing possible erosion effects caused by injecting water or steam upstream of the blades 12.

In another exemplary embodiment, water or steam as cooling medium is injected downstream of the last stage 18 blade 12 where it mixes with the circulating flow and as a result is drawn upstream into the last stage 18.

In another exemplary embodiment, this is achieved by the control element 24 being configured to bleed, extract and/or withdraw working fluid from around the distal region 19 of the last stage 18 blades 12. By this means windage is reduced thus reducing localised overheating.

In another exemplary embodiment, the control element 24 is configured to adjust the mass flow through the turbine and thus control windage based on the principle that significant windage occurs only below above a minimum turbine mass flowrate.

In addition to a sensor 22 and control element 24, exemplary embodiments further include a controller 20 as shown in FIG. 2. The controller 20 is configured by means of programming as well as connection to both the sensor 22 and control element 24 to avoid localised heating of the distal region 19 of the last stage 18 blades 12 by adjusting the control element 24 in response to the physical property measured by the sensor 22.

In an exemplary embodiment shown in FIG. 4, the last stage 18 blade 12 is made of electrically conductive materials, for example, from metal or electrically conductive fibres such as carbon fibre, and the signal transmission means is achieved by a single wire 17. This is achieved by utilising the conductive parts as earthing/grounding for the sensors 22. The single wire 17 arrangement of this embodiment enables greater flexibility in the placement of the transmission wire 17 so as to minimise strain on the wire 17 during turbine 10 operation, thus improving the sensor 22 reliability.

In an exemplary embodiment, the communication between the sensor 22 and the control occurs, at least partially, by wireless means. This may be realised, for example, by the use of telemetric systems or contact rings and includes the use of RFID (radio frequency identification devices) that are configured to be read during operation by the controller 20.

Figure 6:
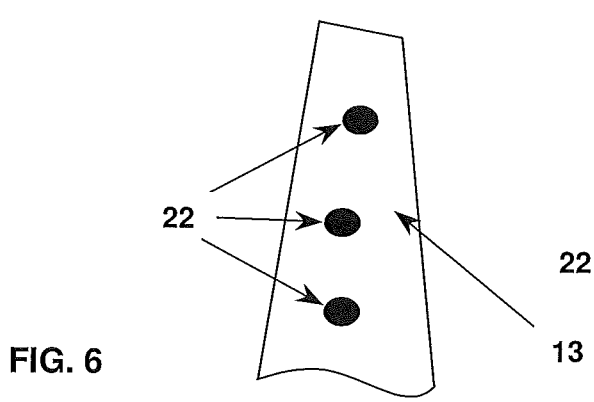
FIG. 6 is a schematic view of an exemplary airfoil with a plurality of sensors.

In an exemplary embodiment shown in FIG. 6, the airfoil 13 comprises a plurality of sensors distributed along the extensional length of the airfoil 13 from the rotor 11. In a further exemplary embodiment, the control action of the controller 20 is based on the relative measurement and/or measurement profile along the extensional length of the airfoil 13.

Although the disclosure has been herein shown and described in what is conceived to be the most practical exemplary embodiment, it will be appreciated by those skilled in the art that the present disclosure can be embodied in other specific forms. For example, the invention may also be applied to axial compressors used in gas turbines 10. In addition, the location of the sensors is not restricted to the distal region 19 but could be distributed along the entire length of the airfoil 13. The presently disclosed embodiments are therefore considered in all respects to be illustrative and not restricted. The scope of the disclosure is indicated by the appended claims rather than the foregoing description and all changes that come within the meaning and range and equivalences thereof are intended to be embraced therein.

The invention claimed is:

1. An axial flow turbine comprising:
   a casing defining a flow path for a working fluid therein;
   a rotor co axial to the casing;
   a plurality of stages, each stage comprising:
      a stationary row of vanes, circumferentially mounted on the casing; and
      a rotating row of blades, circumferentially mounted on the rotor, each blade having an airfoil extending into the flow path therein,
   wherein the plurality of stages include a last stage located towards a downstream end of the turbine, wherein the airfoils of the last stage blades include distal regions that are distal from the rotor; and
   a monitoring control system comprising:
      at least one sensor configured in the distal region of the airfoil of at least one last stage blade, to measure at least one physical property of the at least one last stage blade;

a control element configured to influence the at least one physical property of the at least one last stage blade; and a controller configured to adjust the control element based on the at least one measured physical property so by controlling the at least one physical property, wherein the at least one physical property is moisture and the at least one sensor is configured to measure localised moisture of the at least one last stage blade.

2. The turbine of claim 1, wherein the at least one sensor is embedded in the airfoil of the at least one last stage blade.

3. The turbine of claim 2, wherein the airfoil of the at least one last stage blade has a composite core body and further comprises a covering that covers at least a portion of the airfoil of the at least one last stage blade, wherein the at least one sensor is embedded between the composite core body and the covering.

4. The turbine of claim 2, wherein the airfoil of the at least one last stage blade is made of composite layers, and wherein the at least one sensor is embedded between the composite layers.

5. The turbine of claim 1, wherein the at least one physical property further includes strain, and the at least one sensor is further configured to measure localised strain in the at least one last stage blade.

6. The turbine of claim 1, wherein the at least one physical property further includes temperature, and the at least one sensor is further configured to measure localised temperature of the at least one last stage blade.

7. The turbine of claim 1, wherein the airfoil of the at least one last stage blade further comprises a plurality of sensors distributed along an extensional length of the airfoil of the at least one last stage blade from the rotor, and wherein the at least one physical property is a measurement profile of the plurality of sensors.

8. The turbine of claim 1, wherein the airfoil compromises conductive material, and the conductive material is a ground for the at least one sensor so by enabling the at least one sensor to have one wire.

9. The turbine of claim 1, wherein the at least one sensor and the controller communicate, at least partially, by wireless means.

10. The turbine of claim 1, wherein the control element is a means for adjusting a selection of at least one of: water injection, steam injection, working fluid extraction and mass flow through the turbine.

11. A method for controlling a physical property of at least one last stage blade of an axial flow turbine, the method comprising:

providing a control element configured to influence the physical property of the at least one last stage blade;

measuring the physical property of the at least one last stage blade, wherein the physical property is moisture;

adjusting the control element in response to the measured physical property so by controlling the physical property; and providing the at least one last stage blade that is at least partially made of composite layers, and wherein measuring the physical property includes measuring the physical property at a point between the composite layers.

12. The method of claim 11, wherein the physical property further includes one or more of temperature and strain.

13. The method of claim 11, wherein adjusting the control element involves a selection of at least one of: injecting water, injecting steam, and extracting working fluid.

* * * * *

UNITED STATES PATENT AND TRADEMARK OFFICE
CERTIFICATE OF CORRECTION

PATENT NO.        : 9,638,053 B2
APPLICATION NO.   : 13/903274
DATED             : May 2, 2017
INVENTOR(S)       : Kubel et al.

Page 1 of 2

It is certified that error appears in the above-identified patent and that said Letters Patent is hereby corrected as shown below:

On the Title Page

In Item (72), under "Inventors", in Column 1, Line 2, delete "Kussaberg" and insert -- Küssaberg --, therefor.

In Item (56), under "U.S. PATENT DOCUMENTS", in Column 2, Line 4, delete "Jinnai" and insert -- Jinnai et al. --, therefor.

On Page 2, in Item (56), under "FOREIGN PATENT DOCUMENTS", in Column 1, Line 6, delete "JP  WO 2013042554" and insert -- WO  2013042554 --, therefor.

In the Drawings

In Fig. 6, Sheet 2 of 2, delete " 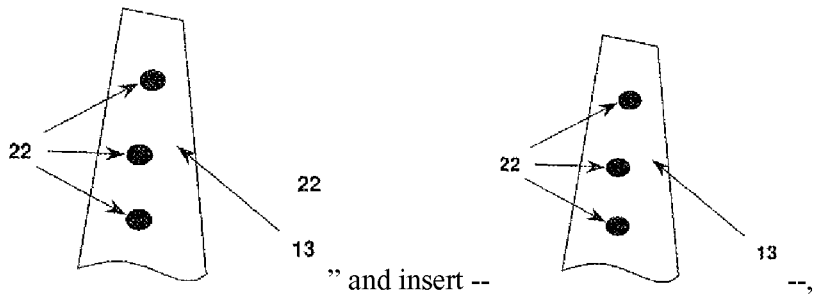 " and insert -- --, therefor.

In the Specification

In Column 2, Line 51, delete "a blades" and insert -- a blade's --, therefor.

In Column 3, Line 18, delete "compromises" and insert -- comprises --, therefor.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,638,053 B2

In Column 4, Line 5, delete "airfoil; and" and insert -- airfoil; --, therefor.

In the Claims

In Column 6, Line 52, in Claim 1, delete "co axial" and insert -- coaxial --, therefor.

In Column 8, Line 1, in Claim 8, delete "compromises" and insert -- comprises --, therefor.